Figure 1:
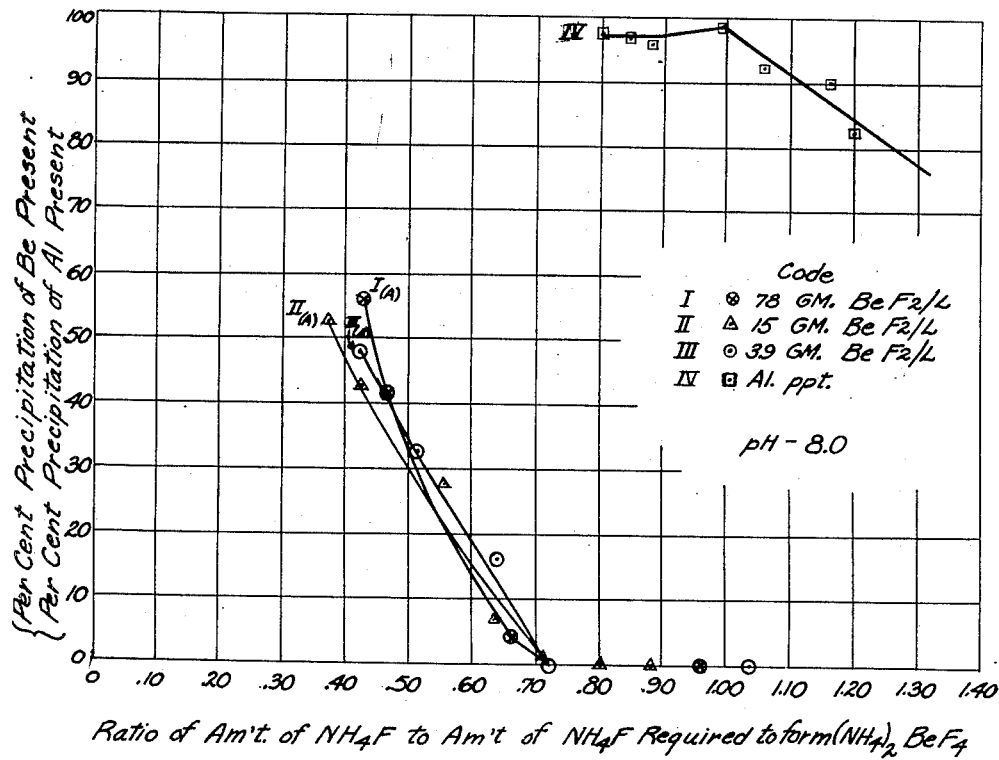

Nov. 24, 1953

C. W. SCHWENZFEIER, JR., ET AL  2,660,515
METHOD OF PRODUCING FLUORIDIC COMPOUNDS
OF BERYLLIUM OF HIGH PURITY
Filed Dec. 3, 1948

Patented Nov. 24, 1953

2,660,515

UNITED STATES PATENT OFFICE 2,660,515

METHOD OF PRODUCING FLUORIDIC COMPOUNDS OF BERYLLIUM OF HIGH PURITY

Carl W. Schwenzfeier, Jr., Bay Village, and Carl S. Pomelee, Elyria, Ohio, assignors, by mesne assignments, to Reconstruction Finance Corporation, Cleveland, Ohio, a corporation of the United States of America Application December 3, 1948, Serial No. 63,384

8 Claims. (Cl. 23—88)

The invention relates to the production of fluoridic compounds of beryllium, and particularly ammonium beryllium fluoride of a high degree of purity.

The general object of the invention is to provide an efficient and economically operable process for the production of such pure compounds.

A further object of the invention is the provision of a process of the character stated by which use can be made of beryllium fluoride solutions obtained from various sources and which may be contaminated with impurities, such as aluminum, silicon, and various heavy elements including iron, nickel, chromium, copper and lead.

The process is based primarily upon the discovery that it is possible to maintain in a solution of ammonium beryllium fluoride a hydrogen ion concentration such as is known to permit precipitation of the above noted impurities, without causing precipitation of beryllium, if there is maintained in the solution a proper concentration of the ammonium fluoride in relation to the beryllium fluoride present. In other words, a suitable relative concentration of the ammonium fluoride and beryllium fluoride present in the ammonium beryllium fluoride solution, which relative concentration we have established, makes possible precipitation of the impurities without precipitation of the beryllium. The well known minimum hydrogen ion concentrations required to precipitate completely hydroxides of the above mentioned elements range from a minimum pH value of approximately 3 for ferric iron to a minimum pH value of approximately 7.5 for aluminum. It is also known that aluminum hydroxide tends to redissolve when the alkalinity of the solution exceeds a pH value of 9. The reagents most suitable for the process are ammonium hydroxide and alkaline earth carbonates, particularly calcium carbonate. However, sulphides have also been found to be operable in practicing the process, particularly for removing the heavy elements nickel, copper and lead in accordance with standard analytical practice.

For a further, more detailed description and explanation of the invention, reference will be made to the accompanying drawings.

In the drawings,

Fig. 1 is a chart showing the per cent of beryllium precipitated as beryllium hydroxide in a series of solutions containing ammonium and beryllium fluorides, as affected by the ratio of the amount of ammonium fluoride present to the amount thereof required to form ammonium beryllium fluoride $(NH_4)_2BeF_4$, the hydrogen ion concentration of the solution being maintained at a pH value of 8. This chart also shows the amount of aluminum precipitated as a basic aluminum compound at a pH value of 8 with various amounts of ammonium fluoride present.

Figure 2:
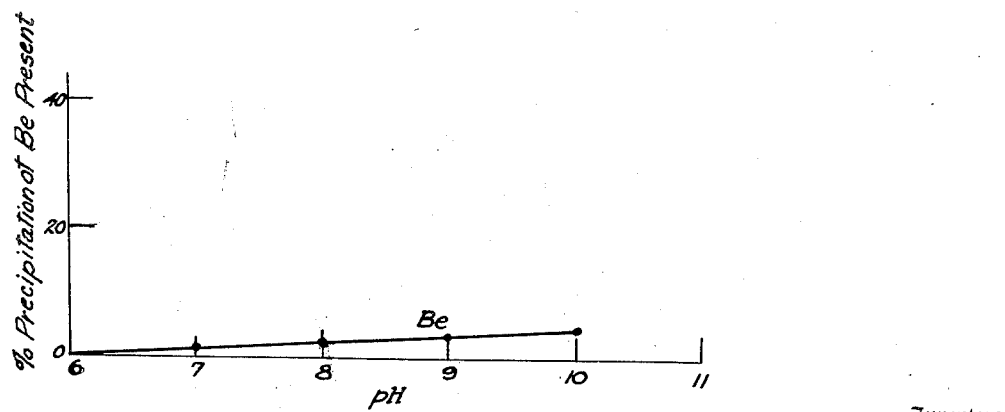

Fig. 2 is a chart showing the effect of hydrogen ion concentration of an ammonium beryllium fluoride $((NH_4)_2BeF_4)$ solution upon the precipitation of beryllium.

Typical results of the behavior of beryllium fluoride solutions are shown in Fig. 1. Curves I, II, and III in this figure indicate the percent of beryllium precipitated as beryllium hydroxide at a pH value of 8, from three different beryllium fluoride $(BeF_2)$ solutions having the concentrations indicated by the "code" on the chart with the addition of various amounts of ammonium fluoride. In the chart the ratio of the amount of ammonium fluoride $(NH_4F)$ present in the solution to the amount thereof required to form ammonium beryllium fluoride $(NH_4)_2BeF_4$, is plotted as abscissa, and the percent by weight of beryllium present that is precipitated, is plotted as ordinate.

To obtain the values plotted for the three curves, pure beryllium fluoride was dissolved in water in amounts of 78, 15, and 3.9 grams of $BeF_2$ per liter, respectively, and varying amounts of ammonium fluoride were added to separate portions of these beryllium fluoride solutions. Ammonium hydroxide was added to each portion to bring the pH to 8.0. A pH value of 8 was selected to assure complete precipitation of all impurity elements, including aluminum which requires the highest alkalinity. The beryllium hydroxide was filtered off and its beryllium content determined. The concentration of ammonium fluoride was calculated from determinations of ammonia in the filtrates. In all cases consideration was given to the amount of additional ammonium fluoride formed by adding ammonium hydroxide to beryllium fluoride according to the reaction $BeF_2+2NH_4OH=Be(OH)_2+2NH_4F$. The abscissae indicate the amount of ammonium fluoride present expressed as the decimal fraction of the stoichiometric amount of ammonium fluoride required to form normal ammonium beryllium fluoride, $(NH_4)_2BeF_4$, with the beryllium present. The points I (A), II (A), and III (A) at the upper ends of curves I, II, and III, represent what occurs when ammonium hydroxide is added to beryllium fluoride solutions containing no ammonium fluoride initially. The only ammonium fluoride present at a pH of 8 is, at these points, entirely derived from the reaction between the ammonium hydroxide and the beryllium fluoride.

Points I (A), II (A), and III (A), therefore, represent the maximum amount of beryllium hydroxide which can be precipitated by ammonium hydroxide from a pure beryllium fluoride solution at the concentrations noted on the chart. The three curves show that by increasing the ammonium fluoride concentration to values higher than it is possible to obtain by the reaction between beryllium fluoride and ammonium hydroxide less and less beryllium hydroxide is precipitated until no precipitation occurs at an ammonium fluoride ratio slightly above 0.7. Thus the results shown in Fig. 1 indicate that at a pH of 8 no beryllium hydroxide is precipitated when the amount of alkali fluoride present is over approximately 70% of the amount stoichiometrically required to form normal ammonium beryllium fluoride, with the beryllium present.

We have also discovered that precipitation of aluminum in ammonium beryllium fluoride solutions of any concentration is affected by the amount of ammonium fluoride in the solution where there is more ammonium fluoride in the solution than is stoichiometrically required to form ammonium beryllium fluoride with the beryllium present. This is shown graphically by Curve IV, Figure 1, which shows aluminum precipitated as a basic aluminum compound. It will be noted from this curve that when there is less than such stoichiometric amount of ammonium fluoride present, virtually all of the aluminum can be eliminated by precipitation.

We also have found that by treating with hydrogen sulphide or other heavy metals precipitants a neutralized or alkaline ammonium beryllium fluoride solution containing ammonium fluoride in an amount more than about 70% of the stoichiometric amount required to form normal ammonium beryllium fluoride, a mixture of insoluble compounds of heavy metals present also may be precipitated, in accordance with standard analytical practice, without any loss of beryllium due to precipitation. Of course, such elements as copper and lead which are known to form acid-insoluble sulphides do not require neutralization of the solution for removal by precipitation.

We have also found that calcium carbonate in powdered form (whiting) is very useful and cheap for the adjustment of the pH value and precipitation of the impurities. The use of this compound (or other carbonates such as magnesium and barium carbonates) eliminates the use of a pH meter. For example, an excess of the calcium carbonate serves as a buffer and maintains the pH value of ammonium beryllium fluoride solutions automatically at a value of approximately 8. In practice this requires a hot solution as the reaction is very slow at room temperature. In addition to serving as a cheap neutralizing agent, calcium carbonate will displace $NH_3$ from hot ammonium beryllium fluoride solution and can therefore be used to insure maintenance of required ammonium fluoride balance for substantially complete precipitation of aluminum from the solution by removing ammonium fluoride in the solution in excess of 100 per cent of the stoichiometric amount previously referred to.

When, for example, $CaCO_3$ was used to adjust the pH of an ammonium beryllium fluoride solution containing

| Be | 17.5  | gm/L |
| Fe | 1.03  | gm/L |
| Al | 0.354 | gm/L | to a value of 8 at 70° C. to 100° C., the solution, after filtration, contained

| Be | 17.4  | gm/L |
| Fe | 0.00  | gm/L |
| Al | 0.002 | gm/L |

From the above description of the invention it will be understood that beryllium fluoride solutions containing ammonium fluoride can be effectively purified, as to all of the above named impurities, by maintaining an alkaline condition of the solution, controlling the ammonium fluoride concentration and (preferably also) the temperature of the solution and by treating the solution with hydrogen sulphide, ammonium sulphide, or other heavy metals precipitants.

The following example will illustrate our purification process, using calcium carbonate to adjust pH value and effect precipitation:

*Step No. 1.—Preparation of solution containing ammonium beryllium fluoride*

A solution containing ammonium beryllium fluoride was prepared by dissolving 54.5 kilograms of crude beryllium oxide in 750 liters of ammonium bi-fluoride solution containing 0.318 kilogram of ammonium bi-fluoride per liter.

Any other method may be used for preparing the solution. The concentration of beryllium can be varied from very dilute to saturation.

*Step No. 2.—Alkalizing*

The solution from Step No. 1 was heated somewhat above 70° C. and 45.4 kilograms of finely ground calcium carbonate were added. This large amount of the carbonate, greatly in excess of the amount required to adjust the pH value of the solution, was added to facilitate filtration and washing. With such large excess of the carbonate reagent it is, of course, unnecessary in practice to determine by analysis the amount of impurities present and the corresponding amount of carbonate required only for precipitation and adjustment of the pH value. The reaction between calcium carbonate and the fluorides present, even in the hot solution employed, is so slow that in practice most of the carbonate remains intact and therefore can be used, as stated, as a filter aid. When the reaction was complete the slurry had a pH of 8.0 to 8.5 and a small amount of ammonia was given off.

Alkalizing agents other than calcium carbonate, such as ammonium hydroxide, may be used in this step.

Although iron will be precipitated at temperatures below 70° C., aluminum precipitation is not substantially complete until this temperature is reached.

*Step No. 3.—Hydrogen sulphide treatment*

If heavy metal impurities are present in the solution, e. g., lead, cadmium, nickel, copper, etc., they can be precipitated by hydrogen sulphide, aluminum sulphide, ammonium sulphide, or other alkali or alkaline earth sulphides. If only iron and aluminum are present as impurities this step may be omitted.

Step No. 4.—Filtration

The slurry from step No. 2 or step No. 3 can be filtered in any convenient manner and the filter cake washed, preferably with slightly alkaline water. If washing of the filter cake is properly carried out, very little occluded beryllium will remain in it.

Step No. 5.—Acidification

The filtrate from Step No. 4 was re-acidified by addition of pure ammonium bifluoride crystals. Pure hydrofluoric acid can also be used.

Step No. 5 is necessary only if the final salt must be free of basic fluorides.

Step No. 6.—Salt production

The solution from Step No. 5 was evaporated and cooled to crystallize ammonium beryllium fluoride, the concentration being carried to a point such that when the specific gravity of the mother liquor was 1.14 at 20° C. 207 kilograms remained in the mother liquor. This mother liquor was added to the next batch at the start of Step No. 2.

The iron content of the salt produced was less than 0.0007% and the aluminum content was less than 0.001%.

It will be undertood that the invention is not limited to the particular procedures which have been described, but that other procedures may be employed within the bounds of the appended claims.

What is claimed is:

1. In a process of removing impurities from an ammonium beryllium fluoride solution by treating the solution with alkaline reagents to precipitate as compounds of the group consisting of hydroxides, carbonates and sulphides and mixtures thereof impurities present of the group consisting of aluminum, silicon, copper, iron, lead, nickel, cadmium and chromium and mixtures thereof, the step of adjusting the amount of ammonium fluoride present in the solution to an amount such that after addition of a sufficient amount of the alkaline reagent to precipitate the impurities to be removed the ammonium fluoride content of the solution will be between 70 percent and 100 percent of the stoichiometric amount required to form normal ammonium beryllium fluoride $((NH_4)_2BeF_4)$ with the beryllium fluoride present.

2. A process as claimed in claim 1, in which an alkaline earth carbonate is used to precipitate impurities and also to eliminate any ammonium fluoride present in excess of 100 percent of the amount required to form ammonium beryllium fluoride with the beryllium present.

3. A process as claimed in claim 2, in which $CaCO_3$ is employed as the alkaline earth carbonate.

4. A process as claimed in claim 1, in which an alkaline earth carbonate is employed as reagent to precipitate the impurities and is used greatly in excess of the amount required for such precipitation.

5. In a process of removing impurities from an ammonium beryllium fluoride solution by treating the solution with alkaline reagents to precipitate as compounds of the group consisting of hydroxides, carbonates and sulphides and mixtures thereof impurities present of the group consisting of aluminum, silicon, copper, iron, lead, nickel, cadmium and chromium and mixtures thereof, the step of adjusting the said solution to an ammonium fluoride content in excess of 70 percent of the stoichiometric amount required to form normal ammonium beryllium fluoride with the beryllium fluoride present, the adjusted solution being characterized by the fact that its beryllium content will not be precipitated by the alkaline reagent.

6. A process as claimed in claim 5, in which an alkaline earth carbonate is used to precipitate impurities.

7. A process as claimed in claim 6, in which $CaCO_3$ is employed as the alkaline earth carbonate.

8. A process as claimed in claim 5, in which an alkaline earth carbonate is employed as reagent to precipitate the impurities and is used greatly in excess of the amount required for such precipitation.

CARL W. SCHWENZFEIER, Jr.
CARL S. POMELEE.

References Cited in the file of this patent

UNITED STATES PATENTS

| Number | Name | Date |
|---|---|---|
| 2,343,293 | Hannay et al. | Mar. 7, 1944 |
| 2,356,183 | Shepard et al. | Aug. 22, 1944 |
| 2,483,287 | Koster | Sept. 27, 1949 |

FOREIGN PATENTS

| Number | Country | Date |
|---|---|---|
| 457,315 | Great Britain | Nov. 25, 1936 |

OTHER REFERENCES

Marignac, Annales de Chemie et de Physique, 4th Ser., vol. 30, page 51 (1873).